United States Patent
Lim

(10) Patent No.: US 8,172,407 B2
(45) Date of Patent: May 8, 2012

(54) CAMERA-PROJECTOR DUALITY: MULTI-PROJECTOR 3D RECONSTRUCTION

(75) Inventor: Jongwoo Lim, Sunnyvale, CA (US)

(73) Assignee: Honda Motor Co., Ltd., Tokyo (JP)

( * ) Notice: Subject to any disclaimer, the term of this patent is extended or adjusted under 35 U.S.C. 154(b) by 1028 days.

(21) Appl. No.: 12/121,056

(22) Filed: May 15, 2008

(65) Prior Publication Data

US 2008/0285843 A1    Nov. 20, 2008

Related U.S. Application Data

(60) Provisional application No. 60/938,323, filed on May 16, 2007.

(51) Int. Cl.
*G06K 9/20* (2006.01)
*G03B 21/14* (2006.01)
(52) U.S. Cl. .......................................... 353/69; 382/154
(58) Field of Classification Search .................. 353/69, 353/70, 94, 121, 122; 348/383; 382/254, 382/286; 356/603, 39; 345/1.3, 214
See application file for complete search history.

(56) References Cited

U.S. PATENT DOCUMENTS

| | | | |
|---|---|---|---|
| 6,520,647 B2 * | 2/2003 | Raskar | 353/70 |
| 6,527,395 B1 * | 3/2003 | Raskar et al. | 353/70 |
| 6,707,444 B1 * | 3/2004 | Hendriks et al. | 345/156 |
| 6,754,370 B1 | 6/2004 | Hall-Holt et al. | |
| 6,813,035 B2 | 11/2004 | Hoffmann | |
| 7,149,544 B2 | 12/2006 | Kuehnel et al. | |
| 7,182,465 B2 | 2/2007 | Fuchs et al. | |
| 7,306,341 B2 * | 12/2007 | Chang | 353/94 |
| 7,724,379 B2 * | 5/2010 | Kawasaki et al. | 356/603 |
| 7,773,827 B2 * | 8/2010 | Jaynes et al. | 382/293 |
| 7,901,093 B2 * | 3/2011 | Tan et al. | 353/121 |
| 7,916,932 B2 * | 3/2011 | Lee et al. | 382/154 |
| 7,942,530 B2 * | 5/2011 | Majumder et al. | 353/30 |
| 2004/0150835 A1 * | 8/2004 | Frick et al. | 356/601 |
| 2004/0257540 A1 * | 12/2004 | Roy et al. | 353/69 |
| 2006/0192925 A1 * | 8/2006 | Chang | 353/94 |
| 2006/0210145 A1 * | 9/2006 | Lee et al. | 382/154 |
| 2007/0057946 A1 * | 3/2007 | Albeck et al. | 345/427 |

(Continued)

FOREIGN PATENT DOCUMENTS

WO    WO 2007059780 A1    5/2007

OTHER PUBLICATIONS

Horn, E., et al., "Toward Optimal Structured Light Patterns," Image and Vision Computing, 1999, p. 1-26.

(Continued)

*Primary Examiner* — William C Dowling
(74) *Attorney, Agent, or Firm* — Fenwick & West LLP; Mark E. Duell

(57) ABSTRACT

A system and method are disclosed for calibrating a plurality of projectors for three-dimensional scene reconstruction. The system includes a plurality of projectors and at least one camera, a camera-projector calibration module and a projector-projector calibration module. The camera-projector calibration module is configured to calibrate a first projector with the camera and generate a first camera-projector calibration data using camera-projector duality. The camera-projector calibration module is also configured to calibrate a second projector with the camera and generate a second camera-projector calibration data. The projector-projector calibration module is configured to calibrate the first and the second projector using the first and the second camera-projector calibration data.

32 Claims, 11 Drawing Sheets

U.S. PATENT DOCUMENTS

2009/0169095 A1* 7/2009 Zhuang et al. .............. 382/154
2009/0245690 A1* 10/2009 Li et al. .................... 382/285

OTHER PUBLICATIONS

Li, H., et al., "Reconstruction Using Structured Light," Fakultät Für Informatik, Feb. 23, 2004.

Pages, J., et al., "A new optimized De Bruijn coding strategy for structured light patterns," Proceedings of the 17$^{th}$ International Conference on Pattern Recognition (ICPR'04), 2004.

Salvi, J., et al., "A robust-coded pattern projection for dynamic 3D scene measurement," Pattern Recognition Letters, May 29, 1998, p. 1055-1065, vol. 19.

Salvi, J., et al., "Pattern codification strategies in structured light systems," Pattern Recognition, 2004.

Zhang, L., et al., "Rapid Shape Acquisition Using Color Structured Light and Multi-pass Dynamic Programming," The 1st IEEE International Symposium on 3D Data Processing, Visualization, and Transmission, 2002.

PCT International Search Report and Written Opinion, PCT/US 08/63665, Aug. 29, 2008, 10 Pages.

* cited by examiner

CAMERA-PROJECTOR DUALITY: MULTI-PROJECTOR 3D RECONSTRUCTION

CROSS-REFERENCE TO RELATED APPLICATION

This application claims priority from U.S. Patent Application No. 60/938,323, entitled "Camera-Projector Duality: Multi-projector 3D Reconstruction", filed on May 16, 2007, which is hereby incorporated by reference in its entirety.

FIELD OF THE INVENTION

The present invention relates generally to computer vision methods and systems of three-dimensional scene reconstruction, and in particular to a projector-based three-dimensional scene reconstruction system using camera-projector duality.

BACKGROUND OF THE INVENTION

Traditional three-dimensional (3D) scene reconstruction algorithms, such as stereo, space-time stereo, multi-view stereo or structured light, measures distance to the objects of the scene by analyzing the triangles constructed by the projection rays of two optical systems. Traditional stereo systems use two cameras to find two projection rays from the two camera centers which meet at the object surface being measured. Space-time stereo systems use two cameras and a projector or a time-varying light resource for 3D scene reconstruction. Multi-view stereo systems use multiple cameras for 3D scene reconstruction. Traditional stereo systems, e.g., space-time stereo and multi-view stereo, require solving a correspondence problem which determines which pairs of points in two images captured by camera(s) are projections of the same point in an object being processed. The process to solving the correspondence problem is generally referred to as epipolar search. This is a very complex problem and computationally expensive.

The camera calibration process estimates the internal and/or external parameters of a camera that affect the 3D scene reconstruction. The internal parameters of a camera, such as camera focal length, optical center location, skewness of image pixels, and radial distortion of the lens, are often called intrinsic camera parameters. The external parameters of a camera define the location and orientation of a camera with respect to some world coordinate system. The external parameters of a camera are often called extrinsic camera parameters. Two calibrated optical systems with respect to a known reference coordinate system, such as two calibrated cameras, or one calibrated camera and one calibrated projector, are related to each other by a translation matrix and a rotation matrix which map a pixel point in one optical system to a corresponding pixel point in the other optical system. Camera-camera calibration calculates the translation and rotation matrices between the calibrated cameras. Similarly, camera-projector calibration calculates the translation and rotation matrices between the calibrated projector and camera.

FIG. 1A is a block diagram illustrating a traditional space-time stereo 3D scene reconstruction system. The reconstruction system illustrated in FIG. 1A comprises a pair of cameras, 102a and 102b, a projector 104 and a camera-camera calibration module 106. The projector 104 projects light patterns to disambiguate correspondence between a pair of projection rays, resulting in a unique match between pixels captured in both cameras 102. A reference coordinate system for reconstruction is defined in one of the cameras 102. The projector 104 needs not be calibrated with the cameras 102 nor defined in the stereo rig of the two cameras 102. For each camera 102, the camera calibration module 106 calibrates the camera 102 and generates extrinsic camera parameters with respect to the reference coordinate system. The camera-camera calibration module 106 also calculates the rotation and translation matrices between the cameras 102 using the intrinsic and extrinsic camera parameters of the cameras 102. The camera calibration module 106 may use any existing camera calibration algorithm which is readily known to a person of ordinary skills in the art such as photogrammetric calibration or self-calibration. To reconstruct the 3D scene, the rotation and translation matrices between the cameras 102 obtained by camera calibration are needed. Additionally, the computational expensive epipolar search for correspondence described above is needed for the reconstruction.

To reconstruct a 360-degree view of a scene, cameras in a traditional stereo or structured light reconstruction system need to go around the scene, and generate depthmaps or point clouds from many views. The reconstruction system then links the reconstructed pieces together. FIG. 1C is a block diagram illustrating a traditional multi-view stereo 3D scene reconstruction system. The reconstruction system in FIG. 1C includes three calibrated cameras 102a-102c and two camera calibration-camera modules 106a and 106b. More calibrated cameras 102 and camera calibration modules 106 may be used for multi-view reconstruction. The camera-camera calibration module 106a calibrates the cameras 102a and 102b and generates the rotation and translation matrices between the calibrated cameras 102a and 102b. Similarly, the camera-camera calibration module 106b calibrates the cameras 102b and 102c. As the traditional space-time stereo reconstruction system illustrated in FIG. 1A, the multi-view stereo reconstruction system in FIG. 1C requires computational expensive epipolar search for correspondence for 3D scene reconstruction.

Traditional structured light systems for 3D scene reconstruction employ one camera and a projector. Light travels from the projector, and is reflected to the surface of the camera. Instead of finding two corresponding incoming projection rays, a structured light algorithm projects specific light pattern(s) onto the surface of an object, and from the observed patterns, the algorithm figures out which projection ray is reflected on the surface of the object in the scene and reaches the camera. Traditional structured light systems require the projected patterns to be well differentiated from the other objects and ambient light falling on the surface of the object being processed. This requirement often translates into a requirement for a high powered and well focused projected light.

FIG. 3A is a block diagram illustrating a structured light reconstruction method running in a traditional structured light 3D scene reconstruction system. The reconstruction system in FIG. 3A includes a camera 102, a reference coordinate system 308 defined in the camera 102, a projector 104, a camera-projector calibration module 116a and an object being processed 302. The camera-projector calibration module 116a calibrates the camera 102a and the projector 104. To calibrate the projector 104 with respect to the reference coordinate system 308, the camera-projector module 116a may use any existing projector calibration method that is known to a person of ordinary skills in the art, such as P. Song, "A theory for photometric self-calibration of multiple overlapping projectors and cameras," IEEE International Workshop on Projector-Camera Systems, 2005, which is incorporated by reference herein in its entirety.

To reconstruct the 3D image of the object 302, the projector 104 projects a plane 306a of a calibration pattern onto the object 302, and the camera 102 observes a reflected ray 306b from the object 302. The reconstruction system in FIG. 3A identifies which projected ray is reflected on the surface of the object 302 and reached the camera 102. For example, the system identifies that an observed point 304 on the surface of the object 302 is the intersection point from the projection plane 306a projected from the projector 104 and the viewing ray 306b from the camera 102. The reconstruction system illustrated in FIG. 3A requires the projected patterns to be well differentiated from the other objects in the scene and ambient light falling on the surface of the object 302 being processed. This requirement often translates into a requirement for a high powered and well focused projected light. In addition, the reconstruction system in FIG. 3A needs to know the camera 102 position relative to the projector 104, i.e., the rotation and translation matrices between the camera 102 and the projector 104, for the reconstruction.

In a conventional camera-projector system using traditional 3D scene reconstruction algorithms, camera(s) need to be attached rigidly to a projector rig, and the rotation and translation matrices between a camera and a projector are required for the reconstruction. Consequently, the reconstruction process is often very computationally expensive, or requires camera motion tracking or mesh stitching to integrate multiple snapshots into a full 3D model.

SUMMARY OF THE INVENTION

To provide flexibility and computational efficiency for 3D scene reconstruction, a projector-based 3D scene reconstruction system exploits camera-projector duality and can use existing 3D scene reconstruction algorithms, e.g., structured light. A projector-based 3D scene reconstruction system calibrates the projectors in the system, and eliminates the need of computational expensive epipolar search for correspondence required by traditional 3D scene reconstruction algorithms. The projector-based reconstruction system has a wide range applications to real world problems, such as three-dimensional scanning systems, multi-projector system with high resolution, natural and effective human-computer interface and augmented reality.

One embodiment of a disclosed system (and method) includes calibrating a plurality of projectors using camera-projector duality. The system includes a camera-projector calibration module and a projector-projector calibration module. The camera-projector calibration module is configured to calibrate a first projector with the camera and generate a first camera-projector calibration data using camera-projector duality. The camera-projector calibration module is also configured to calibrate a second projector with the camera and generate a second camera-projector calibration data. The projector-projector calibration module is configured to calibrate the first and the second projector using the first and the second camera-projector calibration data.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

Figure 1A:
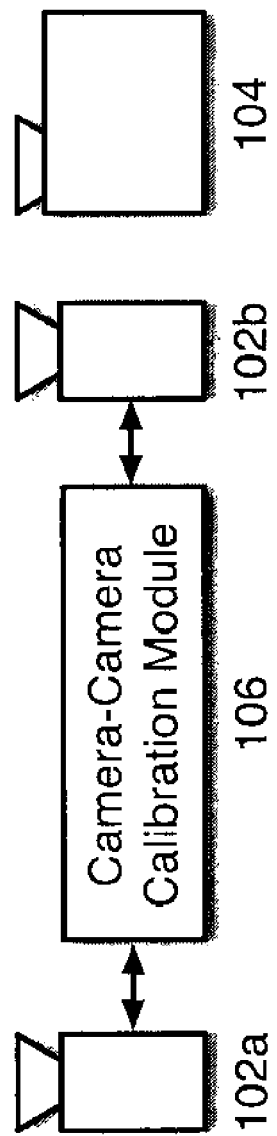
FIG. 1A is a block diagram illustrating a traditional space-time stereo 3D scene reconstruction system.

A preferred embodiment of the present invention is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

Figure 1B:
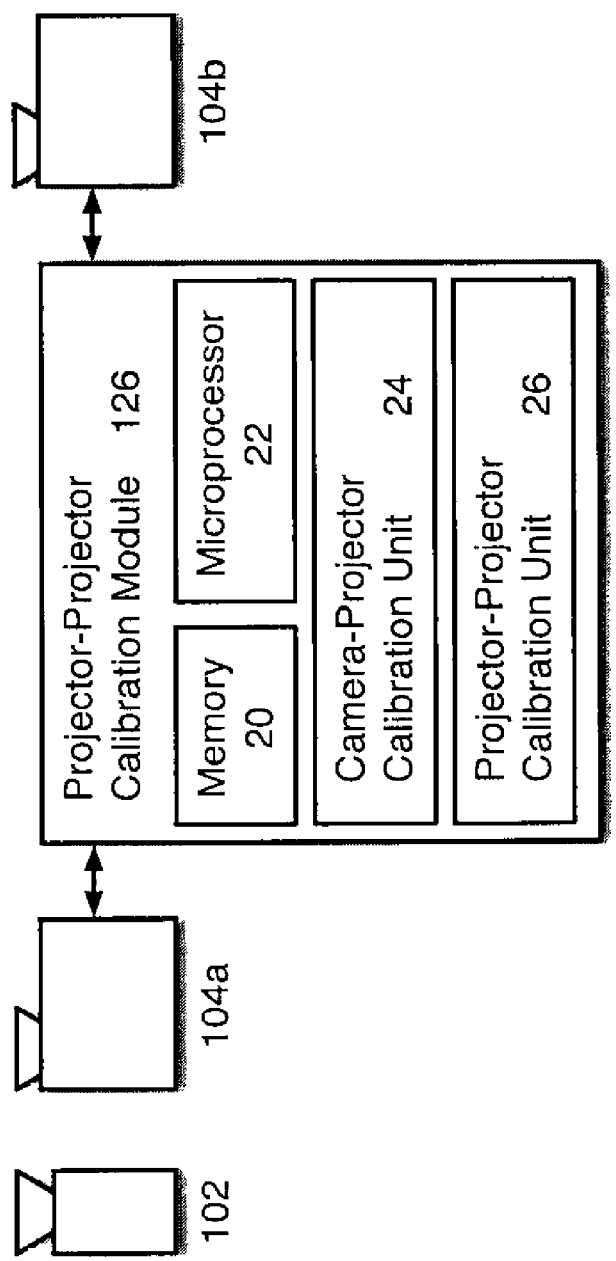
FIG. 1B is a block diagram illustrating a stereo-projector 3D scene reconstruction system according to one embodiment.

FIG. 1B is a block diagram illustrating a stereo-projector 3D scene reconstruction system according to one embodiment. The reconstruction system illustrated in FIG. 1B is the projector-based counter part of the traditional space-time stereo reconstruction system illustrated in FIG. 1A. The two calibrated cameras 102a and 102b in FIG. 1A are replaced by a pair of calibrated projectors 104a and 104b, while the projector 104 in FIG. 1A is replaced by a camera 102. The reconstruction system in FIG. 1B also includes a projector-projector calibration module 126, which calibrates the projectors 104 using camera-projector duality. The result from the projector-projector calibration by the calibration module 116 is the rotation and translation matrices between the projectors 104. In one embodiment, the projector-projector calibration module 126 includes a memory unit 20, a microprocessor 22, a camera-projector calibration unit 24 and a projector-projector calibration unit 26. In other embodiments, the memory unit 20 and microprocessor 22 may reside outside the projector-projector calibration module 126. To simplify the description of an embodiment, the rotation and translation matrices between two calibrated optical systems (e.g., camera-camera or camera-projector) are referred to as calibration data between the two calibrated optical systems from herein and throughout the entire specification.

The camera 102 in the projector-based reconstruction system illustrated in FIG. 1B is used to identify the projected rays reflected on an object surface in a projector-based reconstruction system, and the camera 102 can move freely around the scene to be reconstructed after projector calibration. In addition, the reference coordinate system for reconstruction is defined in one of the projectors 104, not to the camera 102 as illustrated in FIG. 1A. Consequently, in a projector-based reconstruction system as in FIG. 1B, neither extrinsic camera parameters nor computational expensive epipolar search for correspondence is required for reconstruction. Further detail on projector calibration using camera-projector duality is presented in connection with the discussion of FIGS. 3B, 4 and 5.

Figure 1C:
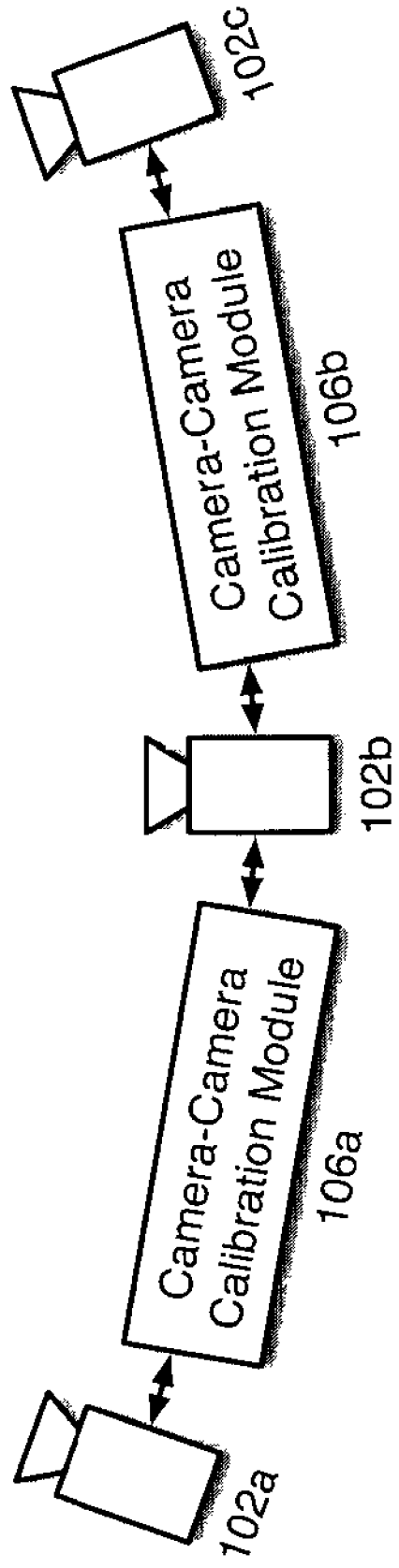
FIG. 1C is a block diagram illustrating a traditional multi-view stereo 3D scene reconstruction system.
Figure 1D:
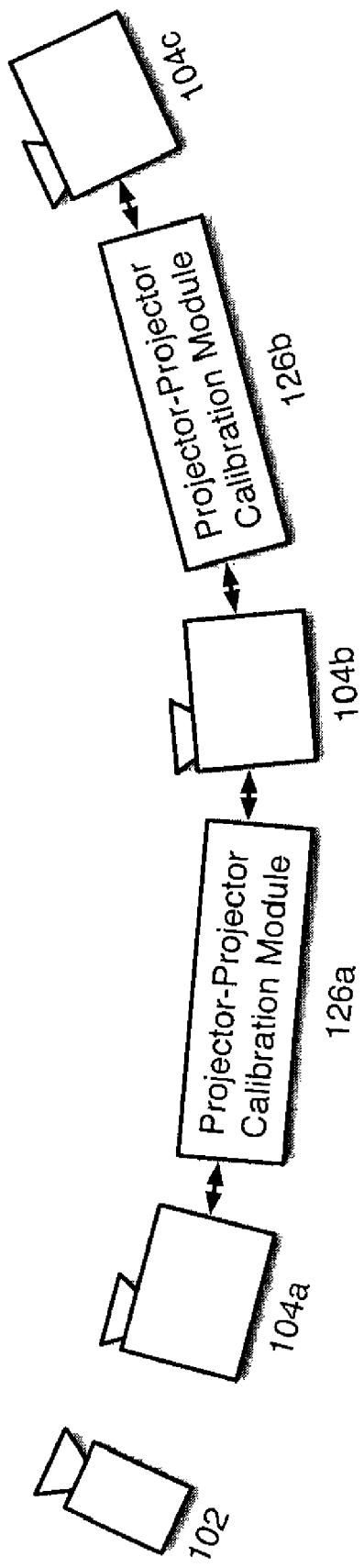
FIG. 1D is a block diagram illustrating an exemplary multi-projector 3D scene reconstruction system according to one embodiment.

FIG. 1D is a block diagram illustrating an exemplary multi-projector 3D scene reconstruction system according to one embodiment. The reconstruction system illustrated in FIG. 1D is the projector-based counter part of the traditional multi-view stereo reconstruction system illustrated in FIG. 1C. The three calibrated cameras 102a, 102b and 102c in FIG. 1C are replaced by three calibrated projectors 104a, 104b and 104c. The reconstruction system in FIG. 1D also includes one or more cameras 102 and projector-projector calibration modules 126 as described in FIG. 1B. In FIG. 1D, only one camera 102 is included for simplicity of description of an embodiment, and more cameras can be used in other embodiments.

In one embodiment, the projector-projector calibration module 126a calibrates the projector 104a and the projector 104b using camera projector duality, and generates the calibration data between the projectors 104a-b. The projector-projector calibration module 126a similarly calibrates the projectors 104b-c. In other embodiments, the projectors 104b-c are calibrated by projector-projector calibration module 126b. Thus, the projector-based reconstruction system illustrated in FIG. 1D does not need the intrinsic and extrinsic parameters of the camera 102 for the reconstruction process after projector calibration. The camera 102 freely moves around the scene to read the projected patterns from a plurality of directions in the reconstruction system. In addition, the reference coordinate system for reconstruction can be attached to one of the projectors 104. Consequently, reconstruction is simple and fast because all projected ray intersection occurs in the same reference coordinate system defined in a projector 104. The computationally expensive epipolar search for correspondence required for reconstruction in a traditional multi-view stereo reconstruction system is no longer needed in the multi-projector based reconstruction system because the intrinsic and extrinsic parameters of the camera 102 are not needed for the reconstruction, and projection rays and planes are all from the projectors 104.

Figure 2:
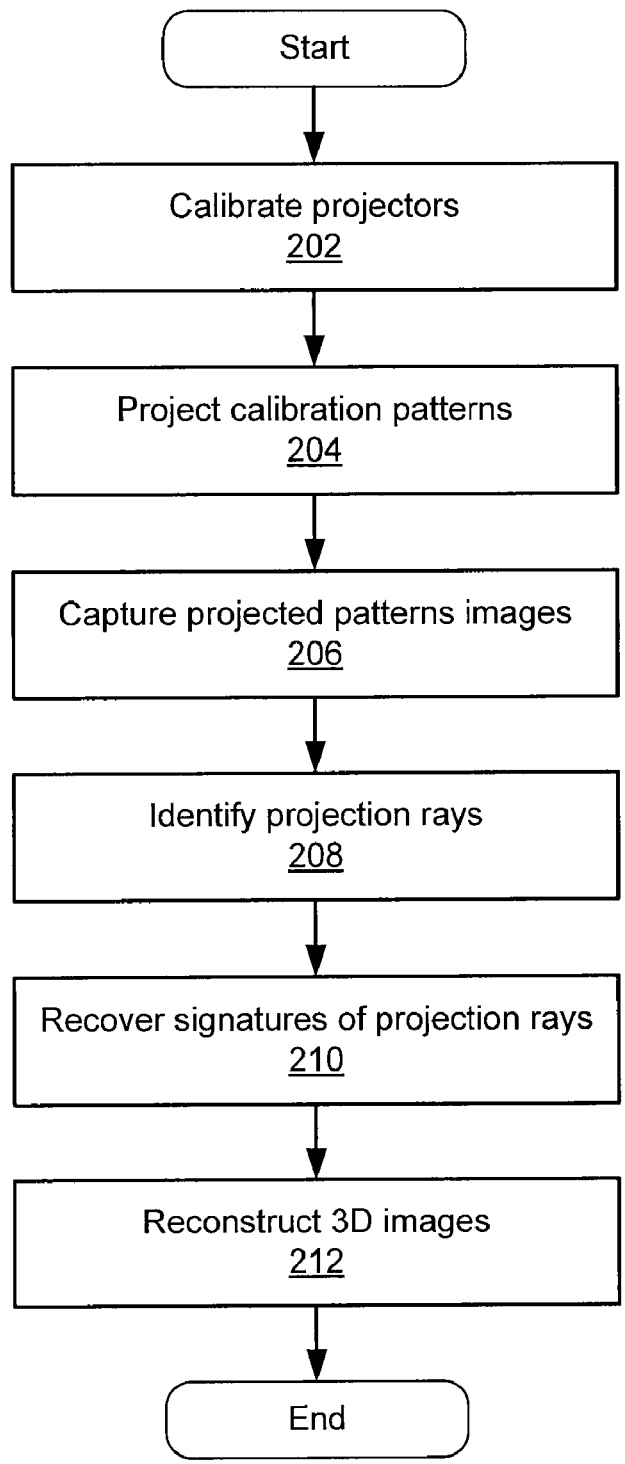
FIG. 2 is a flowchart using a projector-based 3D scene reconstruction method in a projector-based 3D scene reconstruction system according to one embodiment.

FIG. 2 is a flowchart using a projector-based 3D scene reconstruction method in a projector-based 3D scene reconstruction system according to one embodiment. Initially, the projector-based reconstruction system calibrates 202 projectors used in the system using camera-projector duality. Each calibrated projector projects 204 calibration patterns, such as known checkerboard patterns, onto an object in the scene being reconstructed. A camera captures 206 the projected calibration patterns from a plurality of directions. The reconstruction system identifies 208 the projection rays reflected from the object surface to the captured images. Once two projection rays from different projectors are identified, the projection rays are put in the reference coordinate system defined in one of the projectors in the system. The projector-based method recovers 210 the signature, i.e., identification, of each individual projection ray. The intersection point between the two projection rays becomes the reconstructed surface point of the object in the scene being reconstructed. Since the correspondence information between two rays is directly read from the captured images of the projected calibration patterns, the projector-based method does not need to perform the computational expensive epipolar search for correspondence as in a conventional 3D scene reconstruction system. From the information obtained from the above steps, the projector-based reconstruction system reconstructs 212 the 3D scene using any existing 3D scene reconstruction algorithms, such as structured light. Further detail on the steps of identifying projection rays and recovering the signatures of projection rays are presented in connection with the discussion of FIG. 3B.

The projector-based reconstruction system described above needs to calibrate two or more projectors using camera-projector duality (e.g., step 202 in FIG. 2). Cameras and projectors are dual to each other due to the fact that cameras and projectors resemble each other very much in structure and functions except light travels in opposite directions. A camera measures the amount of light arriving on a pixel of a scene from a direction, whereas a projector projects a specified amount of light to the pixel of the scene in the opposite direction. For example, the same format (or types) of intrinsic parameters can be used for both camera and projector camera and projector use 2D array pixels and a lens assembly. Therefore, the projector-based reconstruction system modifies the conventional camera calibration mechanisms used in the stereo camera systems for calibrating projectors.

Figure 4:
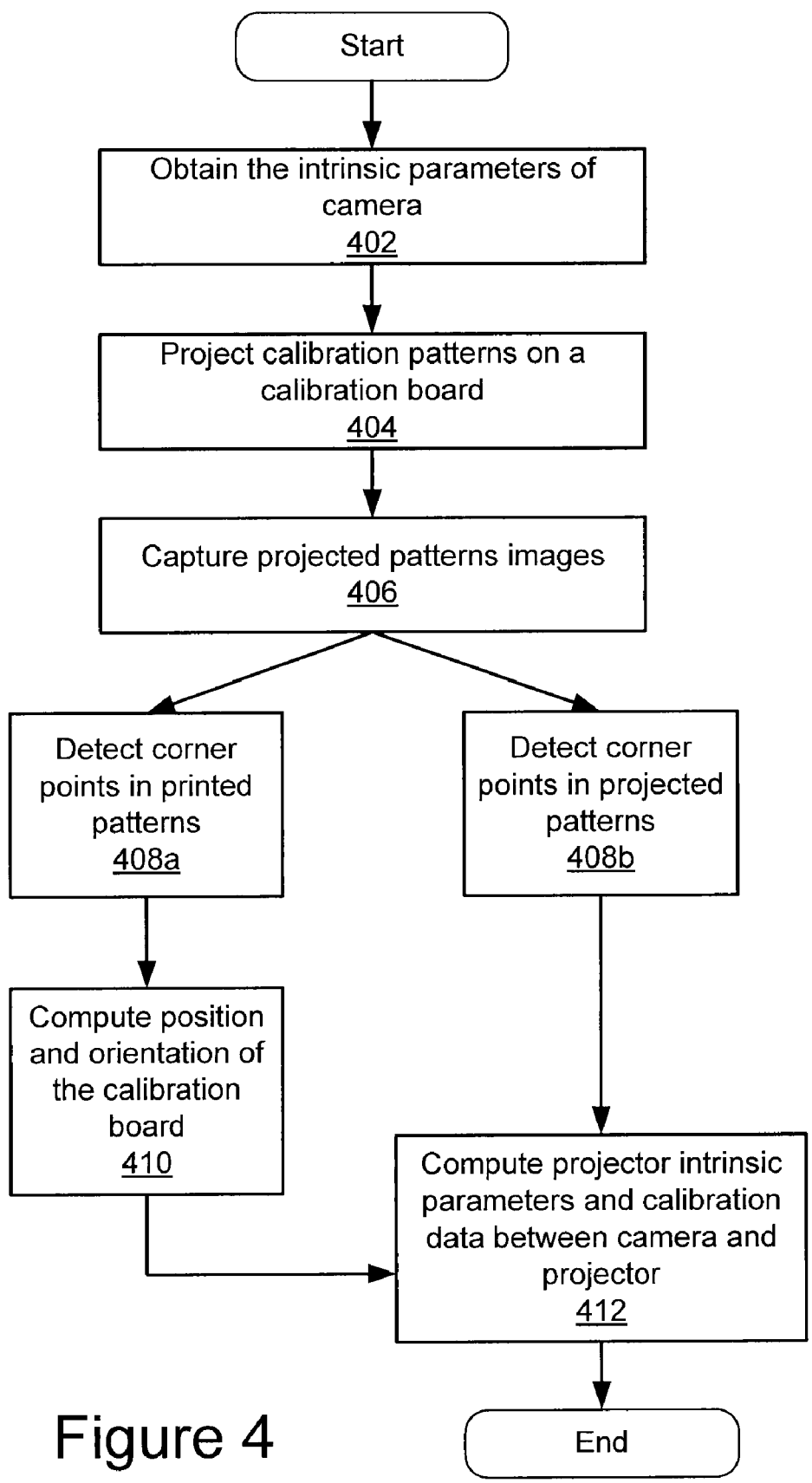
FIG. 4 is a flowchart illustrating a camera-projector calibration method using camera-projector duality according to one embodiment.

In one embodiment, the projector-projector calibration may be implemented in two sequential steps, first by calibrating each individual projector with a camera by camera-projector calibration using camera-projector duality, followed by projector-projector calibration using camera-projector calibration data. FIG. 4 is a flowchart illustrating a camera-projector calibration method using camera-projector duality according to one embodiment, and FIG. 5 is a flowchart of projector-projector calibration method using camera-projector calibration data according to one embodiment.

In FIG. 4, initially, the camera-projector calibration unit 24 of the projector-projector calibration module 126 obtains 402 the intrinsic parameters of the camera using a conventional camera calibration mechanism known to a person of ordinary skills in the art. A projector in the stereo-projector reconstruction system projects 404 calibration patterns with a selected color channel, such as red color, onto a calibration board. In one embodiment, the calibration pattern is a checkerboard pattern and the checkerboard pattern is printed on the calibration board in yellow color. The camera used in the reconstruction system captures 406 the images of the scene being reconstructed. Each image captured by the camera includes the projected patterns onto the calibration board. For example, a sample captured image is an image with red projected calibration pattern on the calibration board where yellow calibration pattern is printed. A red channel of this captured image shows the projected checkerboard pattern, and a blue channel of this captured image shows the printed checkerboard pattern. In one embodiment, the camera-projector calibration unit 24 detects 408 in parallel the corner points of the calibration patterns, one for the printed patterns, i.e., 408a, and the other for the projected patterns, i.e., 408b. From the printed patterns, the calibration unit 24 computes 410 the extrinsic parameters of the calibration board, i.e., the position and orientation of the calibration board in a captured image. From the projected patterns and the extrinsic parameters of the calibration board, the calibration unit 24 computes 412 the camera-projector calibration data between the camera and the projector in addition to the intrinsic parameters of the projector being calibrated. The calibration unit 24 repeats the above steps to calibrate each projector used in the system. The result of such camera-projector calibration is a plurality of camera-projector calibration data.

Figure 5:
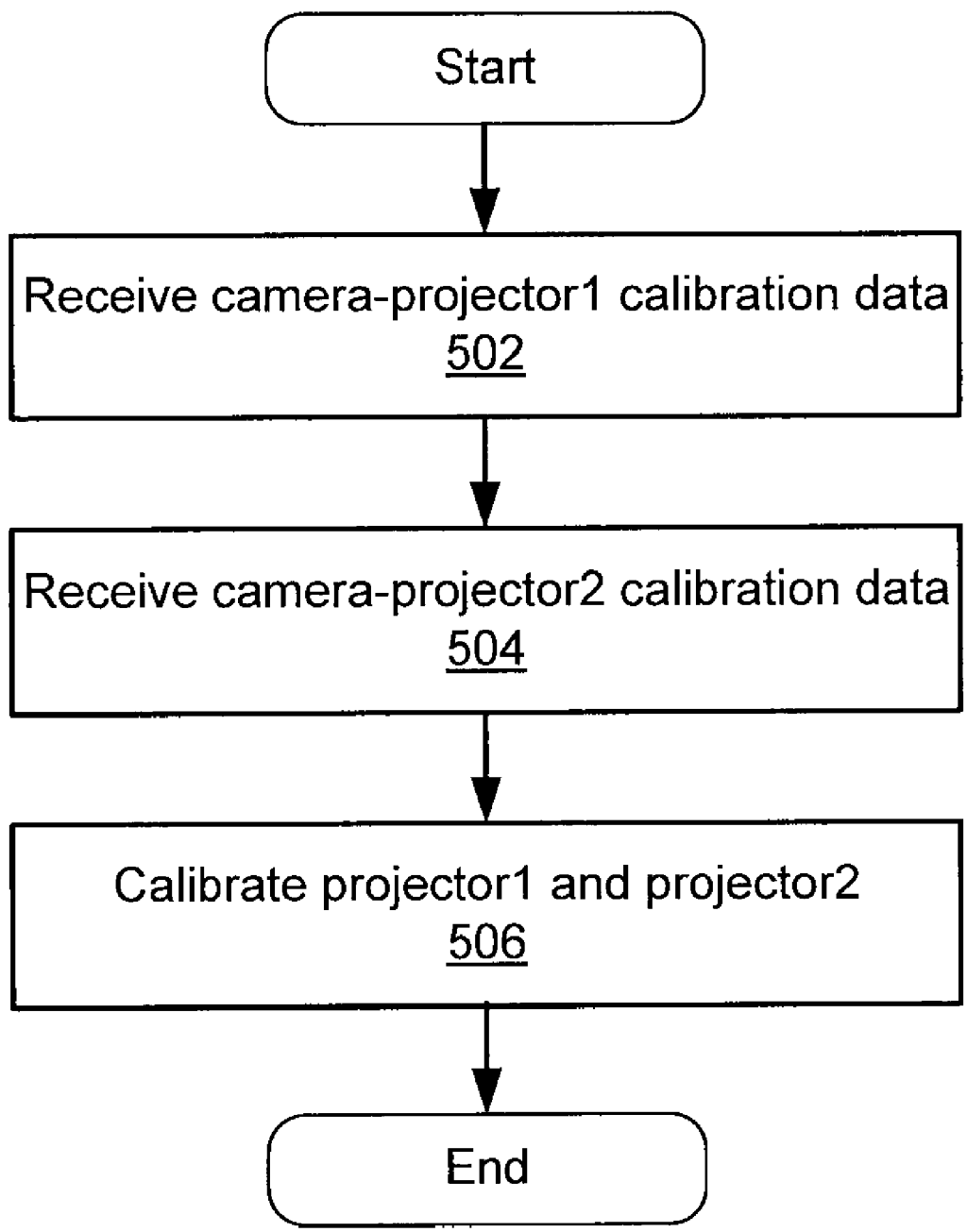
FIG. 5 is a flowchart illustrating a projector-projector calibration method using camera-projector duality according to one embodiment.

FIG. 5 is a flowchart illustrating a projector-projector calibration method using camera-projector duality in a stereo-projector reconstruction system according to one embodiment. In this embodiment, assuming that two projectors projector1 and projector2 are each calibrated with the camera used in the system using the camera-projector calibration method described in FIG. 4, the projector-projector calibration unit 26 of the projector-projector calibration module 126 receives 502/504 the camera-projector1 calibration data between the camera and the projector1, and the camera and projector2 calibration data. The calibration unit 26 then calibrates the projector1 and projector2 using the received calibration data. The result of the calibration from the projector-projector calibration module 126 is the calibration data between the projector1 and projector2, e.g., the rotation and translation matrices between the projector 1 and projector 2.

To further illustrate the projector-projector calibration method using camera-projector duality, as described above, let $R_1$, $R_2$ be rotation matrices which relate the projector1 and projector2 to the camera, and $t_1$, $t_2$ be corresponding translation vectors. $x_c = R_1 x_1 + t_1$, $x_c = R_2 x_2 + t_2$, where $x_1$ and $x_2$ are points in the projector coordinate systems within a projector and $x_c$ is a point in the camera coordinate system. Then $R_{12}$ and $t_{12}$ that describes the transformation between the projector1 and the projector2 can be written as follows, $R_{12} = R_1^T R_2$, $t_{12} = R_1^T (t_2 - t_1)$, since $x_1 = R_1^T (R_2 x_2 + t_2 - t_1)$ holds.

To reconstruct 3D scene, the projector-based reconstruction system described above identifies the projection rays reflected from an object surface to the captured images by a camera (e.g., step 208 in FIG. 2). Conceptually, identifying projection rays is the process of tagging a projection ray with a distinguishable signature or identification, and from the captured image by a camera, recovering the signature of the projection ray that has arrived on the surface point of an object which is corresponding to the pixel in the captured image. In one embodiment, a projection ray identification module uses time sequential binary codes with phase shift to find the projection ray signature. Other embodiments may use other ray/plane identification coding schemes which are known to a person of ordinary skills in the art, e.g., 1D (horizontal or vertical) plane tagging, and 2D ray identification as described in U.S. patent application No. 61/016,304, entitled "Optimized Projection Pattern for Long-Range Depth Sensing", which is hereby incorporated by reference in its entirety.

Generally, a projector can generate many levels of brightness per pixel of an image, but it is not desirable to relay on the magnitude of a projected light for ray identification, especially when a camera may capture the reflected light on an object surface whose reflectance property is unknown. Thus, in one embodiment, the projector-based reconstruction system uses binary codes, i.e., two or three levels of brightness of the projected light, for robust detection of projection ray. The reconstruction system multiplexes the ray signature to multiple channels. The multiplexed ray signatures are then reassembled after capturing. In one embodiment, the channels may be multiple consecutive frames. Other embodiments may use spatial neighborhoods or spectral bands, such as colors, as multiple channels.

To simplify the binary codes described above while maintaining its effectiveness, the projector-based reconstruction system also multiplexes the ray signatures with time. Time-multiplexing is simple but very effective if the scene to be reconstructed is static. Bits of signatures for all projection rays are built as patterns and are projected to the scene being reconstructed. From the captured images, the projector-based reconstruction system detects the bits and assembles the bits into ray signatures. This approach allows spatially dense coding for ray identification. To deal with reconstruction of a scene that is changing, in one embodiment, the projector-based reconstruction system uses the time-multiplexing with phase shift for ray identification detection.

Figure 3A:
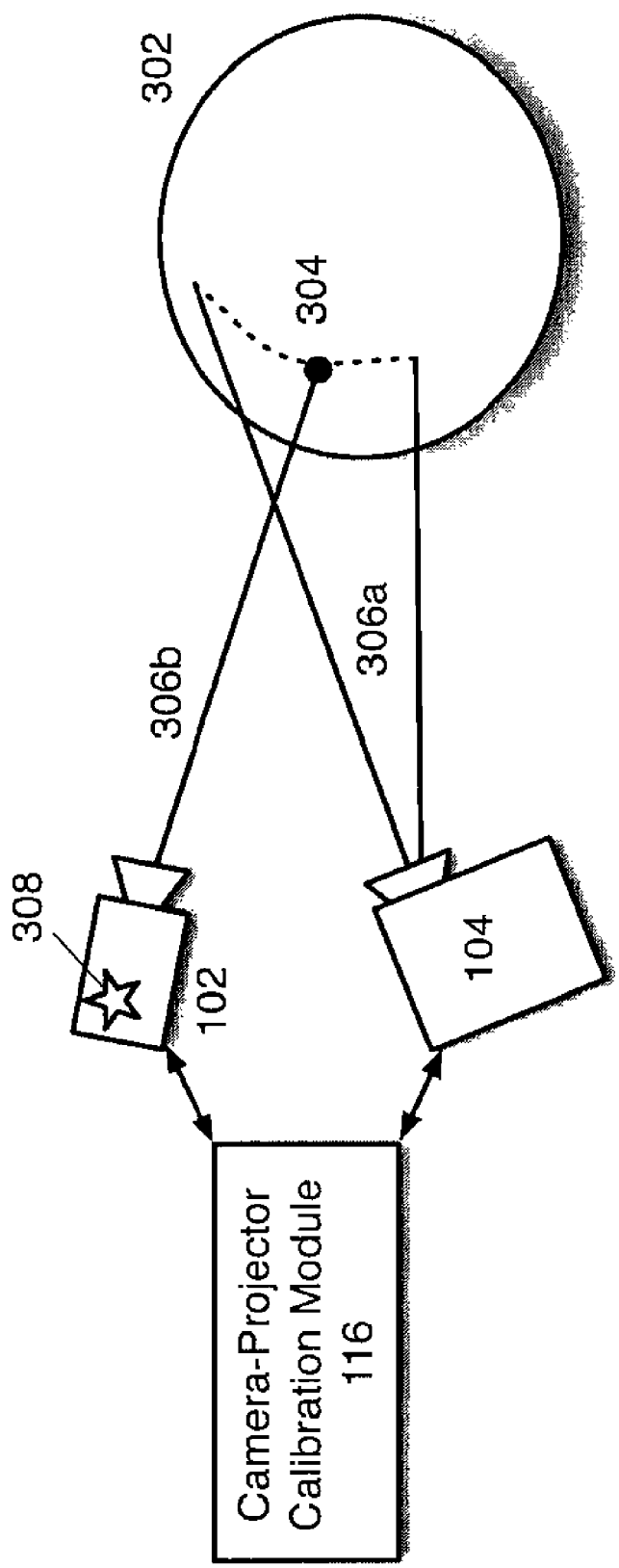
FIG. 3A is a block diagram illustrating a structured light reconstruction method running in a traditional structured light 3D scene reconstruction system.
Figure 3B:
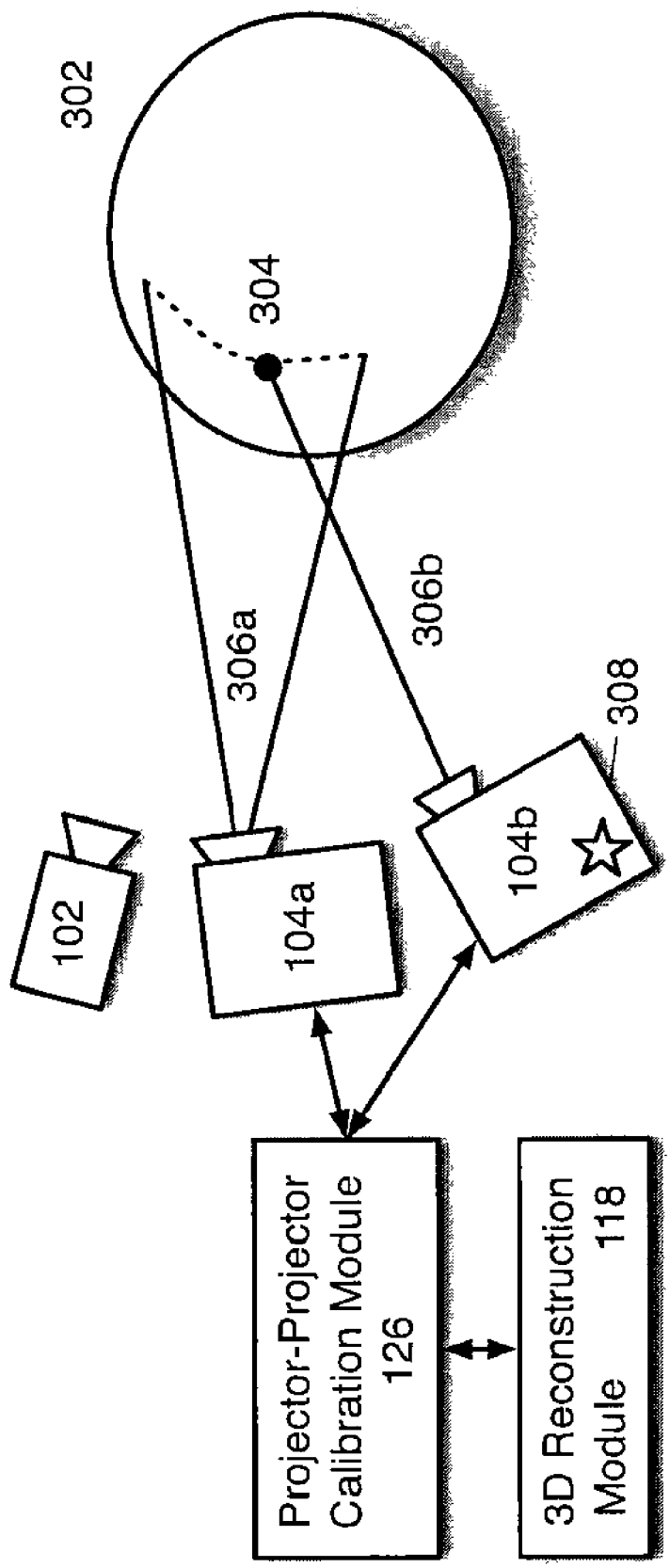
FIG. 3B is an exemplary block diagram illustrating a projector-based reconstruction method running in a stereo-projector 3D scene reconstruction system according to one embodiment

FIG. 3B is an exemplary block diagram illustrating a projector-based reconstruction method running in a stereo-projector 3D scene reconstruction system according to one embodiment. The reconstruction system in FIG. 3B includes two calibrated projectors 104a and 104b, a reference coordinate system 308 defined in the projector 104b, a camera 102 and an object 302 being processed. The reconstruction system in FIG. 3B also includes a projector-projector calibration module 126 and a 3D reconstruction module 118. The projector-projector calibration module 126 calibrates the projectors 104 using camera-projector duality, and calculates the calibration data between the projector 104a and 104b. The 3D reconstruction module 118 identifies the intersection point 304 from the ray 306b projected by the projector 104b and the projector plane 306a from the projector 104a on the surface of the object 302. The projector-based reconstruction system in FIG. 3B treats rays in the projected plane 306a as identical to each other, and only one ray in the plane 306a is used for the reconstruction. It is noted that the projector-based reconstruction system does not need to know a priori of which ray in the plane 306a is to be used for reconstruction.

With respect to the processing steps as described in FIG. 2, a further analysis of projection ray identification of a projector-based reconstruction method is presented in FIG. 3B with the time sequential binary codes with phase shift. The projector-based reconstruction method in FIG. 3B runs on one camera 102 and two rigidly attached projectors 104a and 104b which have been calibrated using camera-projector duality. The camera 102 reads the projected calibration patterns onto the scene being reconstructed. The 3D reconstruction module 118 identifies the intersection 304 of the projection ray 306b from the projector 104b and the projection plane 306a from the other projector 104a. Since the reference coordinate system 308 is defined in the projector 104b, the projector 104b is thus referred to as the reference projector. In one embodiment, the reference projector 104b projects ray-tagging pattern(s) and the other projector 104a projects the plane-tagging pattern(s) onto the surface of the object 302. For a ray-tagging pattern projected by the projector 104b, the 3D reconstruction module 118 identifies the x-, and y-coordinate of the ray-tagging pattern from the projector 104b, e.g., the projection ray 306b. For the projector 104a, the 3D reconstruction module 118 only uses the x-coordinate of the plane-tagging pattern, e.g., the projection plane 306a. From the captured image of the scene with the projected ray-tagging and plane-tagging patterns by the camera 102, the 3D reconstruction module 118 recovers the signatures of two projection rays, one ray being 306b, and the other being a ray in the projection plane 306a. For the pixels on the surface of the object 302, which have both projection rays being detected, the intersection of both rays, such as the intersection point 304 in FIG. 3B, are computed using the calibration data between the two projectors 104a and 104b. The intersection point 304 is the recovered surface point of the object being reconstructed. The 3D reconstruction module 118 repeats the above steps to reconstruct each surface point of the object.

In one embodiment, the camera 102 can be used for reading the projected calibration patterns from the projectors 104. The camera 102 does not need to be calibrated at all (i.e., neither intrinsic nor extrinsic parameters of the camera 102 are needed), thus, the calibration data between the projectors 104 and the camera 102 are no longer needed in the reconstruction process after calibrating the projectors 104, and the camera 102 can move freely around the object 302 as needed to capture the projected calibration patterns. All the reconstruction result will reside in the reference coordinate system within a projector 104. Another advantage of using projector-based reconstruction system illustrated in FIG. 3B is that the correspondence search over an epipolar line between two projected rays or a projection ray and a projection plane is not necessary. Reading projected calibration patterns by the projector-based reconstruction system indicates which projection ray or plane from the projector 104 arrives at the surface of the object 302, and the intersection of two projection rays or one projection ray and one projection plane, e.g., intersection point 304, can be directly computed since the reference coordinate system for reconstruction 308 is defined in the projector 104b.

It is noted that using the projector-based reconstruction system described above, in one embodiment, needs the calibration data between projectors 104 including both intrinsic and extrinsic parameters of each projector 104. To locate each projected ray in the reference coordinate system 308, the projector-based reconstruction system needs the projector 104 extrinsic parameters to locate the optical center and axis of the projector 104, and the projector 104 intrinsic parameters to determine which direction the ray is going from the optical center of the projector 104. The ID of the ray is decoded from the captured images according to the ray-tagging scheme described above.

Figure 6:
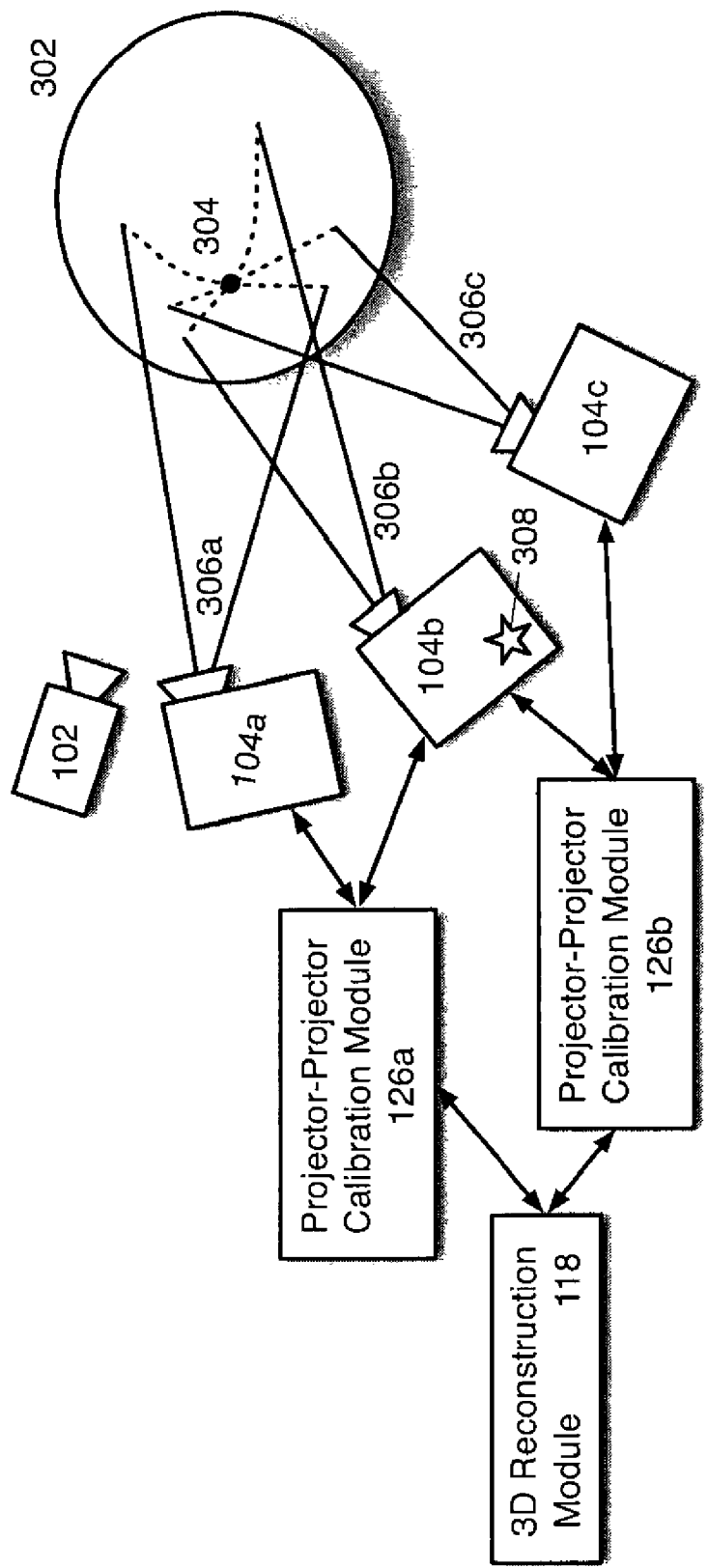
FIG. 6 is an exemplary block diagram illustrating a projector-based reconstruction method running in a multi-projector 3D scene reconstruction system according to one embodiment.

FIG. 6 is an exemplary block diagram illustrating a projector-based reconstruction method running in a multi-projector reconstruction system according to one embodiment. The multi-projector reconstruction system illustrated in FIG. 6 extends the stereo-projector system depicted in FIG. 3B to use additional projectors. In a multi-projector reconstruction system, projectors may project projection planes rather than projection rays as described in the FIG. 3B. This is because projection patterns for projection planes are generally simpler and more robust to noise than patterns for projection rays in a multi-projector reconstruction environment. In response to three projection planes from two or three different projectors being detected by the reconstruction method, the reconstruction method is able to uniquely determine a point in 3D space. To configure the multiple projectors for 3D scene reconstruction, the projector-based reconstruction method illustrated in FIG. 6 calibrates each projector using the camera-projector duality described above. After the projector calibration, the reconstruction method no longer needs the extrinsic parameters of the camera and computational expensive epipolar line search for 3D correspondence as required in conventional space-time multi-view 3D scene reconstruction systems, or the camera motion tracking as required in conventional structured-light multi-view 3D scene reconstruction systems.

The reconstruction system in FIG. 6, in one embodiment, includes three calibrated projectors 104a, 104b, and 104c, one camera 102 and an objector 302 being reconstructed. The reconstruction system also includes two projector-projector calibration modules 126a-b and a 3D reconstruction module 118. In the FIG. 6, the calibration data between the projector 104a and the projector 104c is omitted for simplicity of description of an embodiment; the calibration data between the projectors 104a and 104c can be similarly computed as for other projector pairs. In other embodiments, the multi-projector reconstruction system may include multiple cameras 102 and more than three projectors 104. The reference coordinate system for reconstruction 308 is defined in the projector 104b in the embodiment described in FIG. 6. In other embodiments, the reference coordinate system 308 may be defined in other projectors 104. The calibrated projectors 104a-104c projects projection planes onto the surface of the object 302. From the intersection point on the surface of the object 302, the 3D reconstruction module 118 identifies each individual plane projected from the corresponding projector 104.

For example, in the embodiment illustrated in FIG. 6, each projector 104 projects a projection plane 606 onto the surface of the object 302. Specifically, the projector 104a projects the plane 606a, the plane 606b by the projector 104b and the plane 606c by the projector 104c. The three planes 606a-606c intersects at the intersection point 304 on the surface of the object 302. The 3D reconstruction module 118 in the FIG. 6 identifies each projection plane 306 and its corresponding projector 104 from the intersection point 304.

Figure 7:
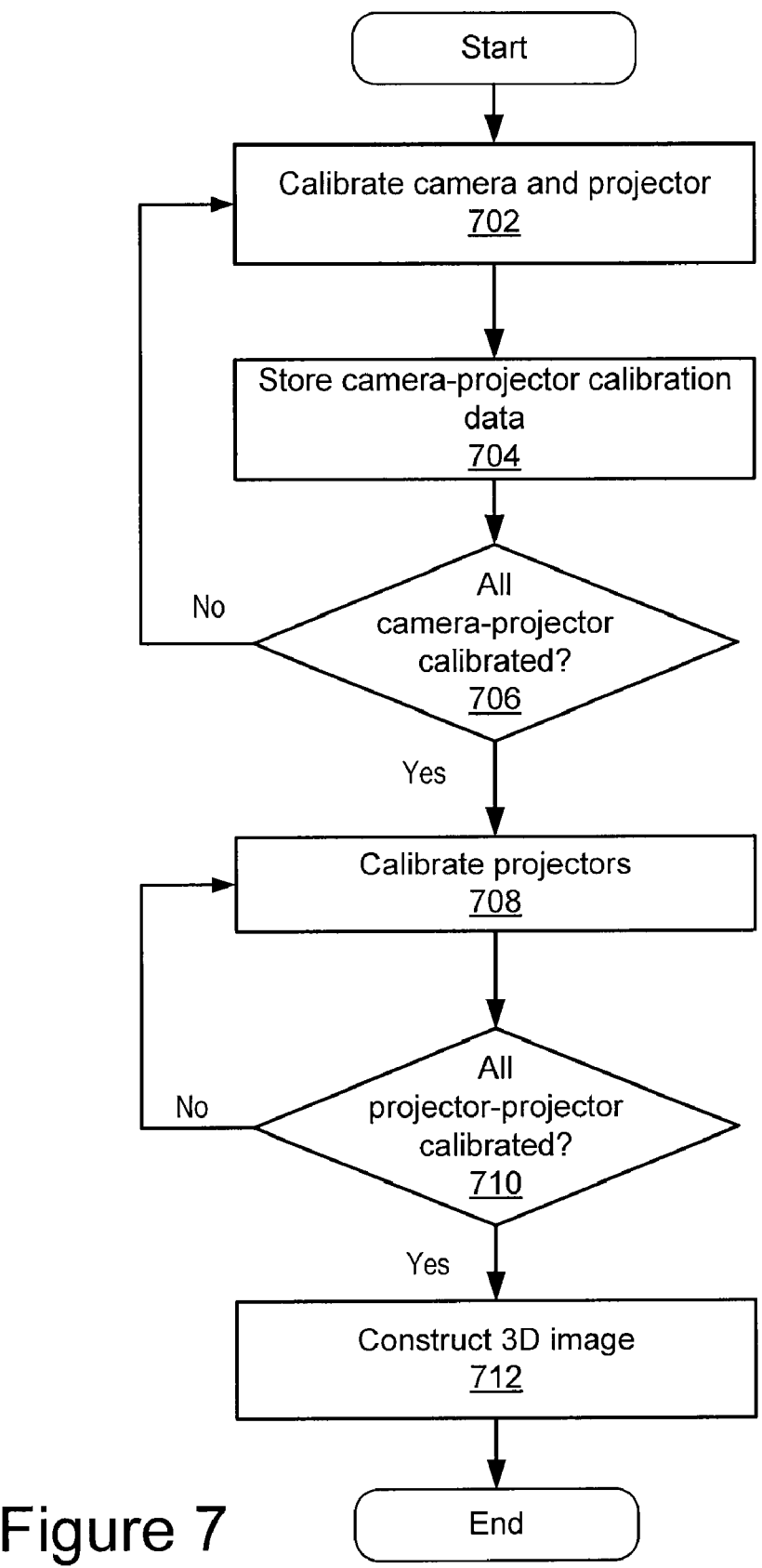
FIG. 7 is a flowchart showing using a projector-based 3D scene reconstruction method in a multi-projector 3D scene reconstruction system according to one embodiment.

FIG. 7 is a flowchart showing using a projector-based 3D scene reconstruction method in a multi-projector reconstruction system as described in FIG. 6 according to one embodiment. Initially, the projector-projector calibration module 126 calibrates 702 the camera 102 and a selected projector 104, e.g., the projector 104a, following the calibration steps such as those described in FIG. 4, and stores 704 the camera-projector calibration data in a storage medium, such as a local cache memory. The projector-projector calibration module 126 checks 706 whether all projectors 104 in the reconstruction system has been calibrated with the camera 102. In response to all pairs of the projectors 104 being calibrated with the camera 102, the projector-projector calibration module 126 calibrates 710 a pair of projectors as described in FIG. 5. In response to not all the projectors 104 being calibrated with the camera 102, the projector-projector calibration module 126 repeats the camera-projector calibration steps 702-706. For each projector-projector calibration, the projector-projector calibration module 126 further checks 710 whether all the projectors 104 have calibrated with each other. Responsive to all the projectors 104 being calibrated, the 3D reconstruction module 118 constructs 712 the 3D scene following the 3D reconstruction steps, e.g., steps 202-214 described in FIG. 2. If not all the projectors 104 have been calibrated with each other, the projector-projector calibration module 126 continues to calibrate 708 the projectors 104, followed by constructing 712 the 3D scene by the 3D reconstruction module 118.

To provide flexibility and computational efficiency for 3D scene reconstruction, it is possible to have a projector-based 3D scene reconstruction system which exploits the camera-projector duality and existing 3D scene reconstruction algorithms, e.g., structured light. The projector-based 3D scene reconstruction system calibrates the projectors in the system, and eliminates the need of computational expensive epipolar search for correspondence required by traditional 3D scene reconstruction algorithms. The projector-based reconstruction system has a wide range applications to real world problems, such as three-dimensional scanning systems, self-calibrating multi-projector system with higher resolution, natural and effective human-computer interface and augmented reality.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A computer implemented method for calibrating at least two projectors for three-dimensional scene reconstruction, the method comprising:
    calibrating a first of the projectors with a camera by a calibration module to generate a first camera-projector calibration data;
    calibrating a second of the projectors with the camera by the calibration module to generate a second camera-projector calibration data; and
    calibrating the first projector with the second projector in a reference coordinate system using the first and second camera-projector calibration data, wherein the reference coordinate system is defined in one of the projectors, and wherein the camera is not in a fixed physical relationship relative to the projectors.

2. The method of claim 1, wherein the first camera-projector calibration data comprises a translation matrix and a rotation matrix between the first projector and the camera.

3. The method of claim 1, wherein the first camera-projector calibration data further comprises intrinsic parameters of the first projector.

4. The method of claim 2, wherein the second camera-projector calibration data comprises a translation matrix and a rotation matrix between the second projector and the camera.

5. The method of claim 4, wherein the second camera-projector calibration data comprises intrinsic parameters of the second projector.

6. The method of claim 1, wherein calibrating a first of the projectors with a camera comprises:
    projecting calibration patterns onto a calibration board;
    capturing a plurality of images of the calibration patterns projected by the first of the projectors;
    computing position and orientation of the calibration board from the plurality of captured images; and
    computing intrinsic parameters of the projector and calibration data between the first of the projectors and the camera.

7. The method of claim 1, wherein calibrating the first projector and the second projector comprises generating calibration data between the first of the projectors and the second of the projectors.

8. The method of claim 1, further comprising defining a reference coordinate system in one of the at least two projectors.

9. The method of claim 1, further comprising identifying projection rays projected by one of the at least two projectors.

10. The method of claim 9, wherein identifying projection rays projected by one of the at least two projectors comprises:
    tagging the projection ray with a distinguishable identification; and recovering the identification of the projection ray using a plurality of images of calibration patterns projected by the projector.

11. The method of claim 9, wherein identifying a projection ray further comprises using a projection ray tagging coding scheme.

12. The method of claim 11, wherein the projection ray tagging coding scheme is time sequential binary codes with phase shift.

13. The method of claim 11, wherein the projection ray tagging coding scheme is non-recurring De Brujin sequence patterns.

14. The method of claim 1, further comprising reconstructing a three dimensional scene of an input scene using calibration data of a plurality of projectors.

15. A computer implemented method for calibrating at least three projectors for three-dimensional scene reconstruction, the method comprising:
calibrating a first of the projectors with a camera by a calibration module to generate a first camera-projector calibration data;
calibrating a second of the projectors with the camera by the calibration module to generate a second camera-projector calibration data;
calibrating a third of the projectors with the camera by the calibration module to generate a third camera-projector calibration data;
after calibrating the first and second projector with the camera, calibrating the first projector with the second projector using the first and second camera-projector calibration data in a reference coordinate system, wherein the reference coordinate system is defined in one of the three projectors; and
after calibrating the first and third projector with the camera, calibrating the first projector with the third projector using the first and the third camera-projector calibration data in the reference coordinate system, wherein the camera is not in a fixed physical relationship relative to the projectors.

16. The method of claim 15, further comprising calibrating the second of the projectors with the third of the projectors using the second and the third camera-projector calibration data.

17. A computer system for calibrating projectors for three-dimensional scene reconstruction, the system comprising:
at least two projectors and at least one camera;
a camera-projector module, configured to calibrate a projector with the camera and to generate a projector-camera calibration data; and
a projector-projector calibration module, configured to calibrate a first of the projectors with a second of the projectors using projector-camera calibration data in a reference coordinate system, wherein the reference coordinate system is defined in one of the projectors and wherein the camera is not in a fixed physical relationship relative to the projectors.

18. The system of claim 17, wherein a camera-projector calibration data comprises a translation matrix and a rotation matrix between the projector and the camera.

19. The system of claim 17, wherein a camera-projector calibration data further comprises intrinsic parameters of the projector.

20. The system of claim 17, wherein a camera-projector calibration module is configured to:
project calibration patterns onto a calibration board;
capture a plurality of images of the calibration patterns projected by the first of the projectors;
compute position and orientation of the calibration board from the plurality of captured images; and
compute intrinsic parameters of the projector and calibration data between the first of the projectors and the camera.

21. The system of claim 17, wherein the projector-projector calibration module is configured to generate calibration data between the first of the projectors and the second of the projectors.

22. The system of claim 17, wherein the camera-projector calibration module is further configured to define a reference coordinate system in one of the at least two projectors.

23. The system of the claim 17, further comprising a projection ray identification module configured to identify projection rays projected by one of the at least two projectors.

24. The system of claim 23, wherein the projection ray identification module is configured to:
tag a projection ray with a distinguishable identification; and
recover the identification of the projection ray using a plurality of images of calibration patterns projected by the projector.

25. The system of claim 23, wherein the projection ray identification module is further configured to use a projection ray tagging coding scheme.

26. The system of claim 25, wherein the projection ray tagging coding scheme is time sequential binary codes with phase shift.

27. The system of claim 17, further comprising a three-dimensional scene reconstruction module configured to reconstruct a three-dimensional scene of an input scene using calibration data of a plurality of projectors.

28. A computer system for calibrating a plurality of projectors for three-dimensional scene reconstruction, the method comprising:
at least three projectors and at least one camera;
a camera-projector module, configured to:
calibrate a first of the projectors with the camera to generate a first projector-camera calibration data;
calibrate a second of the projectors with the camera to generate a second camera-projector calibration data;
calibrate a third of the projectors with the camera to generate a third camera-projector calibration data; and
a projector-projector calibration module, configured to:
after calibrating the first and second projector with the camera, calibrate the first projector with the second projector using the first and second camera-projector calibration data in a reference coordinate system, wherein the reference coordinate system is defined in one of the three projectors; and
after calibrating the first and third projector with the camera, calibrate the first projector with the third projector using the first and the third camera-projector calibration data in the reference coordinate system, wherein the camera is not in a fixed physical relationship relative to the projectors.

29. The system of claim 28, wherein the projector-projector calibration module is further configured to calibrate the second projector with the third projector using the second and the third camera-projector calibration data.

30. A non-transitory computer-readable medium storing executable computer program code for calibrating at least two projectors for three-dimensional scene reconstruction, the computer program product comprising a computer-readable medium containing computer program code for:

calibrating a first of the projectors with a camera to generate a first camera-projector calibration data;

calibrating a second of the projectors with the camera to generate a second camera-projector calibration data; and calibrating the first projector with the second projector using the first and second camera-projector calibration data in a reference coordinate system, wherein the reference coordinate system is defined in one of the projectors and wherein the camera is not in a fixed physical relationship relative to the projectors.

31. A non-transitory computer-readable medium storing executable computer program code for calibrating at least three projectors for three-dimensional scene reconstruction, the computer program code comprising code for:

calibrating a first of the projectors with a camera by a calibration module to generate a first camera-projector calibration data;

calibrating a second of the projectors with the camera by the calibration module to generate a second camera-projector calibration data;

calibrating a third of the projectors with the camera by the calibration module to generate a third camera-projector calibration data;

after calibrating the first and second projector with the camera, calibrating the first projector and the second projector using the first and second camera-projector calibration data in a reference coordinate system, wherein the reference coordinate system is defined in one of the three projectors; and after calibrating the first and third projector with the camera, calibrating the first projector with the third projector using the first and the third camera-projector calibration data in the reference coordinate system, wherein the camera is not in a fixed physical relationship relative to the projectors.

32. The computer-readable storage medium of claim 31, further comprising computer program code for calibrating the second projector with the third projector using the second and the third camera-projector calibration data.

* * * * *